Nov. 17, 1964     G. J. EASTER     3,157,883
WIDE SCREEN PROJECTION SYSTEM FOR STANDARD PRINTS
Filed June 7, 1960
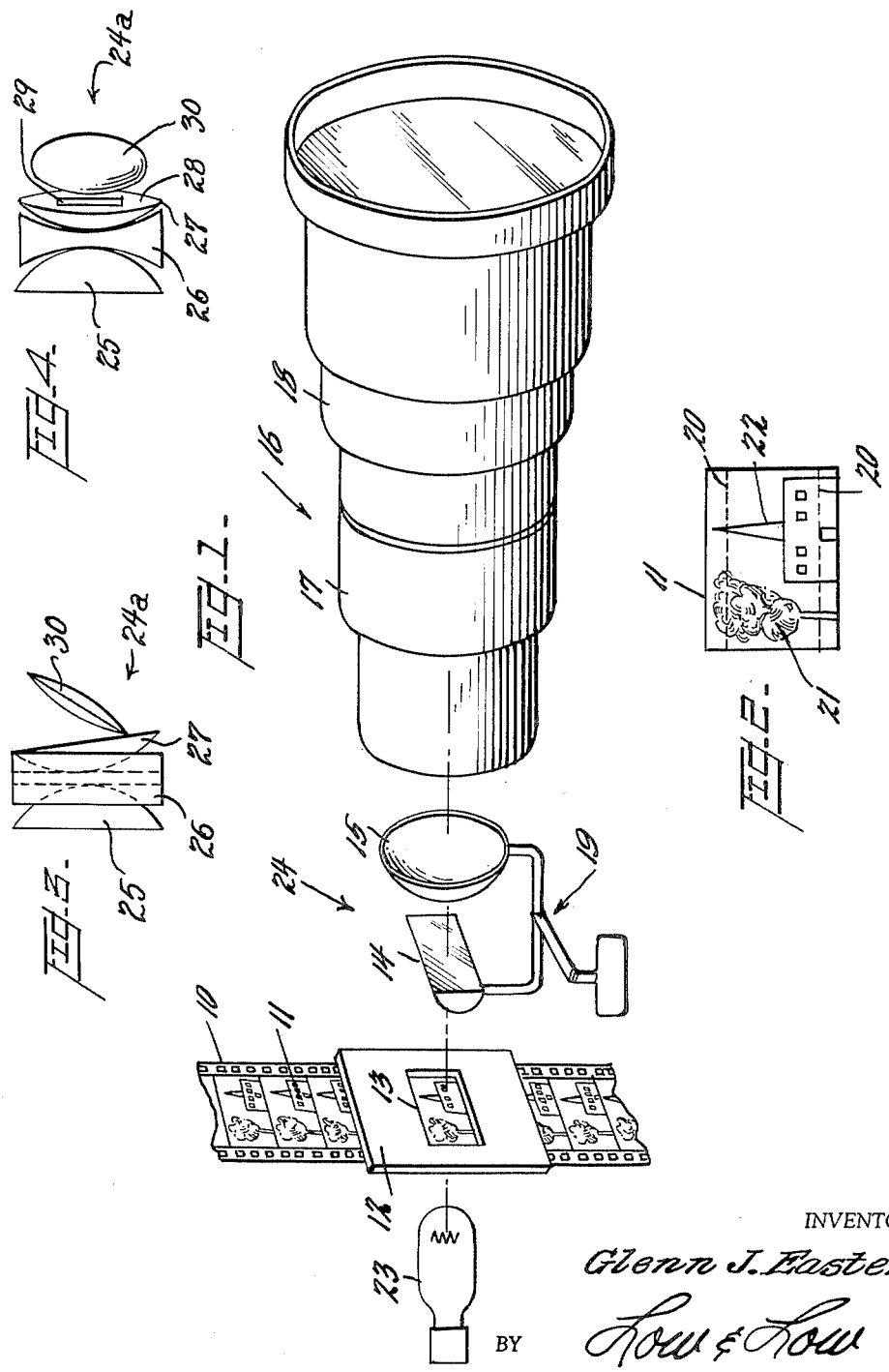
INVENTOR
Glenn J. Easter,
BY Low & Low
his ATTORNEYS

United States Patent Office 3,157,883
Patented Nov. 17, 1964

3,157,883
WIDE SCREEN PROJECTION SYSTEM FOR STANDARD PRINTS
Glenn J. Easter, 402 Redstone St., Republic, Pa.
Filed June 7, 1960, Ser. No. 34,476
7 Claims. (Cl. 352—139)

The present invention relates to a means for projecting a motion picture standard film print onto a wide theater viewing screen having a height-to-width aspect ratio lower than that of the picture frame of the standard film print.

More particularly, I have provided a novel and operative film projection system whereby standard film prints having normally-proportioned images may be projected through a wide screen anamorphosing lens assembly onto the wide viewing screen normally associated with the anamorphotic lens, wherein the resultant image fills the full viewing screen, thereby effecting and enhancing the illusion of depth, or third dimension, as well as providing an effectively more panoramic sweep of view, akin to that provided by specially filmed and prepared "Cinemascope" film prints which are normally exhibited by a conventional anamorphosing projection lens assembly.

It is accordingly an object of my invention to eliminate the non-illuminated lateral screen areas normally present when a standard film print is conventionally projected upon the wide "Cinemascope" type screen found in many motion picture theaters, which blank areas normally serve only to emphasize the boxiness and flatness of small standard print pictures as conventionally exhibited.

It is a further important object of my invention to eliminate or materially reduce the time consuming and intricate steps of removing, replacing, and substituting expensive lens assemblies within a motion picture projector when changing from a wide screen or "Cinemascope" type film to a standard film print, or vice versa, during a motion picture theater presentation, thereby lessening demand and fatigue on the projection technician and thus minimizing damage or error.

A major object of my invention is to provide a supplementary lens assembly which may be easily inserted into a "Cinemascope" projection system for the exhibition of standard film prints, and readily removed for the projection of "Cinemascope" type prints, whereby the "Cinemascope" projection system itself is not subject to handling, removal or replacement, and which therefore may be permanently pro-positioned and pre-focused.

Other material objects and advantages of my invention will become clearly apparent from the following detailed description, taken in connection with the appended drawings, in which:

FIG. 1 is a diagrammatic perspective view of a "Cinemascope" type projection system, wherein an illustrative supplementary lens assembly has been interposed according to my invention.

FIG. 2 is a representation of a standard film print having an illustrative image thereon.

FIG. 3 is a side elevation of a second form of supplementary lens assembly.

FIG. 4 is a top plan of FIG. 3.

The technical efforts of the motion picture industry have, in recent years, been in large part directed toward the development of wide-screen projection systems for the enjoyment of the movie-going public. Such wide screen systems enhance public enjoyment of the motion pictures viewed by increasing the illusion of depth or third dimension effect, and by providing an effective panorama of vision on the viewing screen within which the action transpires.

Of several processes which have been experimentally or commercially developed, among the more successful have been those based in great part upon the teachings of Henri Chretien, wherein the scene has been photographed onto standard 35 mm. film through an anamorphosing lens which compresses the filmed scene in the horizontal dimension, resulting in a print image having a normal height proportion, but a laterally compressed or squeezed print image along the horizontal dimension, all within a standard film frame. The squeezed image is thence projected through a generally similar anamorphosing lens within the motion picture theater projector to thereby laterally expand the squeezed print to a normal horizontal proportion relative to the vertical upon the wide viewing screen of the theater. One such well known anamorphosing wide screen projection system is known as "Cinemascope" and which has met with substantial public acceptance since its introduction in the fall of 1953.

One material economic advantage of the anamorphotic squeezed print wide screen system of "Cinemascope," or those akin thereto, is that the exhibition print may be on the conventional 35 mm. film having frames of the conventional 1:1.33 aspect ratio and which therefore may be exhibited by conventional 35 mm. motion theater projectors, all standard in the industry. In exhibiting "Cinemascope"-type film prints, it is necessary to modify the projector by providing a suitable anamorphosing lens attachment to the back-up or projection throw lens in the projector, and of course, the theater installation of the wide viewing screen normally having the height-width aspect ratio of approximately 1:2.33, replacing the former smaller screen of 1:1.33 aspect ratio, which wide screen projection systems are in widespread use today in most motion picture theaters.

The 1:2.33 aspect ratio of the viewing screen utilized in "Cinemascope"-like projection systems provides a pleasing panoramic sweep of vision to the observer, and materially increases the depth, or third dimension, illusion of the projected scene, thereby heightening the realism and enjoyment thereof by the viewing public. The widespread exhibition of "squeezed print" films on those wide screens of 1:2 aspect ratio or lower has met with favorable response, and the former viewing screen of 1:1.33 aspect ratio suffers by comparison, and appears unduly small, narrow and "flat" as lacking in depth, and consequently relatively objectionable.

The overwhelming majority of motion picture prints for public exhibition, however, are of the standard type as compared with the relatively few more expensive squeezed print type, the former including of course substantially all motion picture reels filmed prior to 1953.

Therefore since the advent and acceptance of "squeezed-print" wide screen projection systems, as "Cinemascope," the motion picture industry and motion picture exhibitors have been confronted with the problem of exhibition of the standard film print, as the public prefers wide-screen projection systems. No means has hitherto been known in the industry for exhibiting conventional standard prints having a proportional image of 1:1.33 aspect ratio fully upon a wide viewing screen having an aspect ratio of 1:2 or lower to produce a wide projected image as preferred by the viewing public.

When a standard film print is currently exhibited as a portion or the entirety of the program in the great majority of the theaters having a wide "Cinemascope" viewing screen, the standard print projected image occupies only the central portion of the screen, leaving a vacant, unilluminated white "wing" on either side of the picture. These unilluminated screen portions are undesirable and only serve to emphasize the smaller size of the projected standard print, its relative "flatness" and generally distract the viewer. In some cases, the exhibitor has provided retractable side curtains to cover the unlit screen areas. Such curtains, or equivalent masking means tend to eliminate the direct comparison of the standard print image with the wide screen area used for "Cinemascope" projection, but of course such measures in no way alter the existence of the smaller, flatter screen image of the standard print.

One means currently being employed to increase the width of the resultant projected image relative to its height, to thereby lessen the contrast between the "Cinemascope" wide screen projection and that of the small standard image, is to employ a conventional aperture plate or masking plate, such as is illustrated at 12 in FIG. 1, whose aperture 13 is in the ratio of approximately 1:2, rather than 1:1.33, and wherein the film image is also approximately 1:2, in an otherwise standard projection system. By this expedient the projected image occupies some 85% of the 1:2.33 wide projection screen, as compared with approximately 60% screen-fill of a standard print projection through a normal 1:1.33 aperture on a wide Cinemascope screen.

In order to achieve this apparent lateral expansion of the projected image, however, the rectangular aperture in the plate 12 and the film image, as stated above, must be changed from a 1:1.33 to a 1:2 ratio, while the standard film frames remain in the ratio of 1:1.33. This manifestly results in a cropping of the filmed image, as illustrated in FIG. 2, wherein the standard 1:1.33 film frame is represented at 11, while the aperture plate opening is vertically reduced as illustrated by the two horizontal dashed lines 20. Consequently only that portion of the filmed image between the lines 20 is projected onto the screen, a full one-third of the film image (one-sixth above, one-sixth below the lines 20) being lost.

Accordingly motion pictures designed to be exhibited by this "cropped" image wide screen projection method must have their scenario tailored so that all of the screen play action occurs within the limits of the lines 20, or the central vertical two-thirds of the picture. It is for this reason that the great bulk of standard films are often unsuited for exhibition by this makeshift method, as is obvious.

A further difficulty present in projection systems employing the aperture plate having the restricted 1:2 opening therein is that the same manifestly require a projection light source of greater intensity to compensate for the restricted aperture opening. Such an intensified light source accordingly calls for a greater power supply and/or more or specially designed carbons when a carbon arc source is employed, and thus incurs greater expense for the exhibitor.

Of course, even with motion pictures especially filmed for these modes of exhibition, the "Cinemascope" screen is still not completely filled, there being several feet of unilluminated screen on each side of the projected image which must be curtained, as above, or left contrastingly and distractingly blank, as the print images maintain their normal proportions throughout projection, and of course, no anamorphosing lens is employed.

The foregoing sets forth briefly the problem of providing maximum theater enjoyment and entertainment of the movie-going public with respect to the standard film print vis-a-vis the wide screen "Cinemascope" squeezed prints. There exists also the equally important, if not more important, problems of the motion picture exhibitors or projection technicians in this connection, as discussed hereinafter.

When the motion picture exhibitor wishes to present a "Cinemascope" or laterally squeezed print, he must substitute in his projector a standard Cinemascope make-up or lens assembly, such as is shown at 16, for the conventional standard print projection lens. The "Cinemascope" make-up customarily comprises a back-up lens 17 for controlling the theater throw of the projected image and an anamorphosing lens 18 which re-expands the laterally squeezed film print image to its normal proportions. The back-up lens 17 and the anamorphosing lens 18 are normally sold as a single unit 16, commonly known as the "Cinemascope" make-up lens assembly. One such "Cinemascope" make-up lens well known in the trade is the "Zeiss Anamorphot 2 x 63." The "Cinemascope" make-up lens assembly 16 is normally quite large and heavy, and by virtue of the necessary precision manufacture of the anamorphosing lens incorporated therein and its associated back-up lens, these units 16 are quite expensive, often exceeding $2,000.00 for a pair of the same.

An aperture plate 12 is also employed whose rectangular aperture is the same size as the film print image, having a height to width ratio of 1 to 1.33.

When it is desired to show a standard film print as part of the program, as is usually the case, it becomes necessary for the exhibitor or projectionist to manually remove the large heavy and expensive "Cinemascope" make-up lens assembly 16 and replace the same with the conventional standard lens in order to exhibit the standard film print. The "Cinemascope" make-up 16 is then carefully laid aside while the standard print is exhibited, the projected image of which of course occupies only a small fraction of the large "Cinemascope" screen as above discussed.

If the standard print to be exhibited is one of those which have been adapted to be exhibited in the cropped 1 to 2 aspect ratio as compared to the conventional 1 to 1.33 aspect ratio, it will be necessary to remove the full size aperture plate 12 also, and substitute therefor one having a cropped opening as mentioned above in connection with FIG. 2, as well as removing the "Cinemascope" lens 16.

It is not uncommon for the motion picture theatre program to include a full length squeezed print "Cinemascope" feature, a standard print newsreel, a cropped standard film short subject feature, and perhaps a standard print cartoon for example, or perhaps a "Cinemascope" short subject may be substituted for one of these standard prints on the program. The running or exhibition time of these several short subjects is each of very short duration, often between five and fifteen minutes apiece. It will be readily appreciated that the projection technician is confronted with the rather difficult task of swiftly, accurately and properly removing, replacing, or laying aside a plurality of aperture plates, large and heavy "Cinemascope" make-up lens assemblies, and standard lenses, and maintaining or readjusting proper focus, with each change, all with respect to the two or more projectors located within the projection booth in addition to his normal full-time duties. All of this must be performed efficiently within the precise and predetermined time limits of the running length of the several reels of the short subjects and feature film, in addition to the normal tasks of keeping the reels in proper running sequence and effecting the changing and threading of the same with respect to their several projectors. The projection technician or exhibitor therefore must in effect perform a juggling act with the large expensive "Cinemascope" make-up lens assembly and the several aperture plates, as well as refocus the projection system with each substitution of the Cinemascope lens assembly 16 for conventional lens or vice versa.

By the method and apparatus of my invention, I achieve the novel and practical results of eliminating all of the problems as above discussed of the movie industry, motion picture theatre exhibitors, and projectionists, and at the same time my invention provides a greater measure of satisfaction and enjoyment by the movie-going public of standard film prints presented as an entirety or a portion of the movie theatre program.

To this end, I provide a supplementary lens assembly 24 which I removably interpose before the Cinemascope lens 16, i.e. between the Cinemascope lens assembly and the aperture plate 12 having the full sized opening 13. When the supplementary or adapter lens assembly 24 is so positioned, a conventional 35 mm. film 10 having standard film prints 11 thereon is projected by means of light source 23 through aperture 13, supplemental lens assembly 24 and the "Cinemascope" lens assembly 16 onto the wide "Cinemascope-type" viewing screen.

The interposition of supplementary lens assembly 24 enables the projected image to substantially completely fill the wide screen laterally as well as vertically. Thus, there are neither undesirable or vacant unilluminated screen portions, nor does the projected image exceed the peripheral confines of the screen. The function of the supplementary lens assembly 24, FIG. 1 is to vertically expand the image of standard proportions projected from the standard film print while leaving the horizontal dimension substantially unchanged so as to thereby accommodate the subsequent lateral or horizontal expansion of the image by the "Cinemascope" anamorphosing lens 18. In the absence of my supplementary lens 24, the resultant projected image may of course fill the wide viewing screen, but the image is so radically distorted horizontally, i.e. slim persons would look fat, as to render the same completely useless as a medium of pleasurable entertainment and communication.

The thus projected standard film print presents an image of the same lateral extent as does the "Cinemascope" squeezed print, and accordingly imparts a greatly enhanced illusion of depth and panoramic field. The realism of such an image is especially striking when contrasted with the conventionally projected standard film print whose image is some 60% smaller, far more "boxed in," flat and two-dimensional.

One example of a supplementary lens assembly which I have found to produce the results above described is illustrated at 24 and comprises a semi-cylindric lens 14 and a circular negative lens 15. The semi-cylindric lens 14 is disposed rearwardly adjacent aperture plate 12 while negative lens 15 is forwardly thereof adjacent back-up lens 17.

The two lenses 14 and 15 are conveniently fixedly mounted upon a bracket illustrated at 19 to facilitate insertion of the same into position within the projector. The projector is preferably provided with suitable channels or support members to receive the supplementary lens assembly 24 and properly support the same in a predetermined position within the projector.

In one specific physical embodiment of supplementary lens assembly which I have employed with successful results, the convex rear face of lens 14 is spaced one-quarter inch from the film strip 10, the aperture plate 12 being disposed therebetween. The semi-cylindric lens 14 itself is one and one-sixteenth inches in length, having a radius of one-half inch. The negative lens 15 is disposed forwardly of lens 14, having its convex face spaced one inch from the planar face of lens 14. Lens 15 is two and one-half inches in diameter, and is commonly known in the optical trade as a one-half diopter. The "Cinemascope" lens assembly 16 is spaced forwardly of lens 15 by one and one-fourth inches. The center lines of aperture 13, lens 14, negative lens 15 and Cinemascope lens 16 (Zeiss 2 x 63 Anamorphot) all lie along a common axis. The image projected therefrom onto and fully filling the viewing screen with this system in an experimental exhibition apparatus arrangement is substantially eleven feet in height and twenty-eight feet in width, as compared with a normal standard print projection proportional thereto of only about sixteen feet width.

With the above described arrangement of supplementary lens assembly 24, the lens 14 vertically expands the normally-proportioned image projected therethrough, while substantially maintaining the horizontal dimension thereof, whereby the image at this point is thus relatively horizontally compressed in a proportion approximating "Cinemascope" film images. The lens 15 in my experimental set up only slightly uniformly reduces the image periphery, and it will be seen that the conventional "Cinemascope" lens assembly 16 horizontally expands the converted, relatively horizontally compressed image received from lens assembly 24 to full "Cinemascope" viewing screen width.

With "cropped" prints above referred to, wherein the images are normally proportioned and of standard frame width, but the effective image is reduced in height, my supplementary lens assembly 24 converts the same to the frame size of the usual 35 mm. "Cinemascope" print and with the image therewithin proportioned similarly to the "Cinemascope" laterally squeezed image. Thus these films printed with normally-proportioned images may now be projected through an anamorphosing lens of the "Cinemascope" type, and fill the "Cinemascope" screen. Accordingly, my invention achieves the novel results of (1) permitting exhibition of normally-proportioned prints through a conventional anamorphosing projection lens assembly; (2) obviates the previous necessity for removing the anamorphosing lens assembly when showing normally proportioned prints; and (3) presents a fully filled wide screen image for the enjoyment of the viewing audience. With old style conventional 1:1.33 normally-proportioned prints, there will be of course, some loss at the top and bottom of the picture.

When it is desired to exhibit a "Cinemascope" or squeezed print film, the supplementary lens assembly is easily withdrawn by means of handle bracket 19 from its projector mount, and, of course, the standard film 10 is replaced by the reel of "Cinemascope" film.

Thus by the simple expedient of inserting the supplementary lens assembly 24 with respect to the conventional "Cinemascope" projection system illustrated in FIG. 1, a standard film print having a normally-proportioned film image may be projected to full viewing screen width, while the easy removability thereof enables the operator to exhibit "Cinemascope" horizontally squeezed film print images with equal facility.

Further, as will be readily appreciated, the supplementary lens assembly is inexpensive, especially as compared with the large "Cinemascope" lens, and very light in weight.

It will be seen therefore that in addition to the enhanced entertainment characteristics of standard film prints resulting from the practice of my invention, all of the several intricate lens substitutions formerly necessary in shifting from a "Cinemascope" presentation to a normally proportioned image film print presentation, or vice versa, are eliminated and reduced to one simple easily effected operation, to wit:

(1) The supplementary lens assembly 24 is inserted into the permanently set up "Cinemascope" projection system when exhibiting a normally proportioned image film print 10, and (2) The supplementary lens assembly 24 is removed therefrom when exhibiting a "Cinemascope" or laterally squeezed film print.

The supplementary lens assembly 24 of FIG. 1 illustrates one operative embodiment of the novel supplementary lens assembly which I have employed. In FIGS. 3 and 4 I have illustrated a second operative form of supplementary lens assembly 24a which I have developed in connection with the method and apparatus of my invention. The assembly 24a is employed in lieu of the assembly 24 of FIG. 1, and I have found the same to achieve excellent results in full scale theater test experiments.

The supplementary lens assembly 24a comprises a sphero-convex-plano lens 25 disposed with its plane face adjacent the aperture plate 12. The spherical face of lens 25 is tangent to one concave face of a cylinder double concave lens 26 whose axes of concavity are vertically disposed. Forwardly of lens 26 is a second sphero convex-plano lens 27 whose convex face is tangent to the other concave face of lens 26. It will be noted that the planar face of lens 27 is tilted approximately 15 degrees from the vertical in a counterclockwise direction as viewed in FIG. 3. Further, the plane face of the lens 27 is masked at 28 so as to be opaque to light rays, leaving a clear central rectangular area 29 through which the light rays may pass. Disposed with its lowermost periphery in tangency with the mask of lens 27 and adjacent the lower edge of the rectangular aperture 29 thereof, is a sphero double convex lens 30. The lens 30 is disposed nearest lens train 16 and is tilted from the vertical at an angle of about thirty degrees in the opposite direction from lens 27.

The lenses 25, 26, 27, and 30 of assembly 24a are suitably mounted together in fixed relation to one another to provide a unit-handled assembly which may be readily mounted or demounted from a projector having cooperating supporting surfaces, in a manner like that discussed in connection with supplementary assembly 24.

In more detail, and to aid in the full understanding of my invention, the specific character of the lenses which I employed in the successful theater experimental tests of supplementary lens assembly 24a are as follows:

(1) Lens 25 is a positive 10.00 diopter sphere convex-plano lens in crown glass;

(2) Lens 26 is a negative 20.00 diopter cylinder double concave (—10.00 on each side) lens in flint glass;

(3) Lens 27 is identical in optical character to lens 25, positioned as illustrated and described;

(4) Lens 30 is a positive 6.40 diopter double convex lens in crown glass, positioned as illustrated and described.

Briefly stated, in respect to supplementary lens assembly 24a, lens 25 effects uniform magnification of the projected image in both horizontal and vertical directions, retaining the normal proportions thereof. Lens 26 then compresses the horizontal dimension of the over-wide magnified frame. The inclined lens 27 and 30 further rectify and modify the projected image so that the same closely approximates the distorted proportions of usual "Cinemascope" film images as it is projected into "Cinemascope" lens frame 16.

Thus, supplementary lens assembly 24a of FIGS. 3 and 4 converts a normally-proportioned image into an image having the relatively compressed proportions of "Cinemascope" film, although by different means than the supplementary lens assembly 24, FIG. 1. The supplementary lens assembly 24a also capably achieves the novel results set forth in connection with supplementary lens assembly 24.

The composition of the supplementary lens assembly is susceptible of several variations of lens types, prisms, mirrors, and physical arrangements thereof which will achieve the results and solve the problems I have described. Accordingly, other lens forms capable of being incorporated in my invention may be found by derivation of experiment.

The essential requisite of the supplementary lens assembly is that the same relatively horizontally compresses the normally-proportioned print image to an image having a laterally squeezed appearance closely approximating that of the usual "Cinemascope" print prior to projection of the thus modified image through the associated "Cinemascope" lens train 16. In this manner the compatible supplementary lens assembly and lens train 16 present a full wide screen projected image free of noticeable distortion or cropping as discussed earlier.

I have described the novel projection system of my invention with respect to the practical problems of the motion picture house exhibitor and in connection with the entertainment aspect of the public audience in attendance, wherein my invention finds great utility and is of immense practical benefit. My wide screen projection system for normally proportioned image film prints is also readily adaptable for other fields of motion picture exhibition, such as the amateur 8 mm. and 16 mm. home movie field, or in closed television transmission exhibition of standard prints utilizing flat wall mounted console or table model receivers having wide viewing screens.

In the foregoing specification and drawings, wherever I have made reference to "Cinemascope" type or "Cinemascope" film prints, etc., I intend reference to laterally squeezed film print images recorded or printed upon films of generally conventional dimensions, which are normally exhibited through a suitable conventional anamorphosing or uni-directional image-expanding lens assembly, of which the well known "Cinemascope" projection system is representative.

What is claimed is:

1. In combination, a conventional anamorphosing projection and exhibition system of the character employed for projecting and exhibiting film prints having frames of standard width and wherein the image within the frame is horizontally compressed to distort the proportions thereof, including an anamorphosing lens assembly and a wide viewing screen disposed forwardly thereof, and a supplementary lens assembly mounted rearwardly of said anamorphosing lens assembly, said supplementary lens assembly having optical elements for converting film print images of normal proportions to images having said distorted proportions while substantially maintaining said standard frame width prior to projection thereof through said anamorphosing lens assembly, whereby film prints having normally-proportioned images may be projected and exhibited by said conventional anamorphosing system without removal of said anamorphosing lens assembly.

2. The combination of claim 1 wherein said supplementary lens assembly is removably mounted rearwardly of said anamorphosing lens assembly, and includes manually graspable means to facilitate mounting or demounting thereof, whereby said supplementary lens assembly may be inserted for exhibition of film prints with normally-proportioned images, and may be withdrawn for exhibition of film prints having said distorted print images.

3. The combination of claim 1 wherein said supplementary lens assembly comprises a negative lens disposed adjacent said anamorphosing lens assembly and a semicylindric lens disposed rearwardly of said negative lens with its planar face adjacent thereto.

4. The combination of claim 1 wherein said optical elements include a lens which vertically expands the film image to thereby distort the same and effect relative horizontal compression thereof.

5. In combination, a conventional anamorphosing projection and exhibition system of the character employed for projecting and exhibiting film prints having frames of standard width and wherein the image within the frame is horizontally compressed to distort the proportions thereof, including an anamorphosing lens assembly and a wide viewing screen disposed forwardly thereof, and a supplementary lens assembly mounted rearwardly of said anamorphosing lens assembly, said supplementary lens assembly having optical elements for converting film print images of normal proportions to images having said distorted proportions while substantially maintaining said standard frame width, said optical elements comprising a first sphere convex-plano lens, a negative cylinder double concave lens having its axes of concavity disposed vertically, and having its rearmost concave face tangent to the spherical face of said first lens and forwardly thereof, a second sphere convex-plano lens forwardly of said negative lens having its spherical face tangent to the forward concave face of said negative lens, and having its planar face tilted from the vertical, an opaque mask covering said planar face of said second lens and defining an uncovered planar face area of rectangular shape, and a sphere double convex lens disposed forwardly of said second lens having peripheral tangential contact with said mask adjacent said rectangular area and being tilted from the vertical in an opposite direction and to a greater degree than said second lens, whereby the film prints having normally proportioned images may be projected and exhibited by said conventional anamorphosing system without removal of said anamorphosing lens assembly.

6. The supplementary lens assembly of claim 5 wherein said second lens is tilted substantially 15° from the vertical, and said double concave lens is tilted substantially 30° from the vertical.

7. In combination, a conventional anamorphosing projection and exhibition system of the character employed for projecting and exhibiting film prints having frames of standard width and wherein the image within the frame is horizontally compressed to distort the proportions thereof, including an anamorphosing lens assembly and a wide viewing screen disposed forwardly thereof, and a supplementary lens assembly mounted rearwardly of said anamorphosing lens assembly, said supplementary lens assembly having optical elements for converting film print images of normal proportions to images having said distorted proportions while substantially maintaining said standard frame width, said optical elements including a lens for uniformly enlarging the normally-proportioned image both vertically and horizontally whereby the apparent frame width becomes greater than said standard width, and said optical elements further including a lens for horizontally compressing the enlarged image to reduce the apparent frame width to substantially said standard width thereby distorting the image, whereby film prints having normally-proportioned images may be projected and exhibited by said conventional anamorphosing system without removal of said anamorphosing lens assembly.

References Cited in the file of this patent

UNITED STATES PATENTS

| 1,753,222 | Timoney | Apr. 8, 1930 |
| 1,960,577 | Dirkes | May 29, 1934 |
| 2,017,634 | Newcomer | Oct. 15, 1935 |
| 3,046,832 | Winzenburg | July 31, 1962 |

FOREIGN PATENTS

| 335,864 | Great Britain | Oct. 2, 1930 |
| 343,512 | Great Britain | Feb. 16, 1931 |
| 1,204,785 | France | Aug. 10, 1959 |

OTHER REFERENCES

Altman, R.: "The Optics of Cinemascope," pages 10 and 11 in International Projectionist, vol. 29, August 1954.